United States Patent
Laplace et al.

(10) Patent No.: US 9,302,918 B2
(45) Date of Patent: Apr. 5, 2016

(54) PROCESS FOR PREPARING AN OXYHALOGENIDE AND/OR OXIDE OF ACTINIDE(S) AND/OR OF LANTHANIDE(S) FROM A MEDIUM COMPRISING AT LEAST ONE MOLTEN SALT

(71) Applicant: Commissariat a l'energie atomique et aux ene alt, Paris (FR)

(72) Inventors: Annabelle Laplace, Avignon (FR); Jean-Francois Vigier, Caderousse (FR); Thierry Plet, Orange (FR); Catherine Renard, Ronchin (FR); Francis Abraham, Genech (FR); Cyrine Slim, Paris (FR); Sylvie Delpech, Massy (FR); Gerard Picard, Fontenay Sous Bois (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/345,855

(22) PCT Filed: Sep. 25, 2012

(86) PCT No.: PCT/EP2012/068881
§ 371 (c)(1),
(2) Date: Mar. 19, 2014

(87) PCT Pub. No.: WO2013/045450
PCT Pub. Date: Apr. 4, 2013

(65) Prior Publication Data
US 2014/0219900 A1    Aug. 7, 2014

(30) Foreign Application Priority Data
Sep. 26, 2011 (FR) .................................... 1158572

(51) Int. Cl.
| | | |
|---|---|---|
| C01G 43/00 | (2006.01) |
| C01G 56/00 | (2006.01) |
| C01G 43/01 | (2006.01) |
| C01G 43/025 | (2006.01) |
| G21C 19/48 | (2006.01) |
| G21F 9/30 | (2006.01) |
| C01F 17/00 | (2006.01) |

(52) U.S. Cl.
CPC .......... *C01G 56/005* (2013.01); *C01F 17/0043* (2013.01); *C01F 17/0056* (2013.01); *C01F 17/0068* (2013.01); *C01G 43/01* (2013.01); *C01G 43/025* (2013.01); *G21C 19/48* (2013.01); *G21F 9/308* (2013.01); *C01P 2002/88* (2013.01); *C01P 2004/20* (2013.01); *C01P 2004/38* (2013.01); *Y02W 30/884* (2015.05)

(58) Field of Classification Search
None
See application file for complete search history.

(56) References Cited

U.S. PATENT DOCUMENTS

| | | | |
|---|---|---|---|
| 2,948,586 A * | 8/1960 | Moore | ............................... 423/5 |
| 3,063,794 A | 11/1962 | Grimes et al. | |
| 3,117,836 A | 1/1964 | Gibson et al. | |
| 3,154,379 A * | 10/1964 | Benedict et al. | ................... 423/5 |
| 3,420,639 A | 1/1969 | Mullins et al. | |

FOREIGN PATENT DOCUMENTS

| | | |
|---|---|---|
| BE | 665647 | 10/1965 |
| FR | 1 589 028 | 3/1970 |

OTHER PUBLICATIONS

French Search Report issued Jun. 15, 2012 in Patent Application No. 1158572 with English translation of categories of cited documents.
International Search Report Issued Oct. 24, 2012 in PCT/EP12/068881 Filed Sep. 25, 2012.

* cited by examiner

*Primary Examiner* — Steven Bos
(74) *Attorney, Agent, or Firm* — Oblon, McClelland, Maier & Neustadt, L.L.P.

(57) ABSTRACT

The invention relates to a process for manufacturing an oxychloride or oxide of actinide(s) and/or of lanthanide(s) from a chloride of actinide(s) and/or of lanthanide(s) present in a medium comprising at least one molten salt of chloride type comprising a step of bringing said chloride of actinide(s) and/or lanthanide(s) present in said medium comprising at least one molten salt of chloride type into contact with a wet inert gas.

19 Claims, No Drawings

PROCESS FOR PREPARING AN OXYHALOGENIDE AND/OR OXIDE OF ACTINIDE(S) AND/OR OF LANTHANIDE(S) FROM A MEDIUM COMPRISING AT LEAST ONE MOLTEN SALT

TECHNICAL FIELD

The invention relates to a process for preparing an oxyhalogenide and/or oxide of actinide(s) and/or of lanthanide(s) from a medium comprising at least one molten salt, said oxyhalogenide being, for example, an oxychloride and the molten salt being, for example, a molten salt of the chloride type.

This process may form part of the reprocessing of irradiated nuclear fuels and may, particularly, find application in the design of nuclear fuels based on actinide(s), which are intended to enter into the constitution of nuclear fuel rods for nuclear reactors or instead in the design of transmutation targets used to carry out nuclear transmutation experiments, particularly with a view to better understanding the mechanism of transmutation of certain actinide elements, such as the minor actinides.

It is pointed out that, for the remainder of the description, minor actinide is taken to mean actinide elements other than uranium, plutonium and thorium, formed in nuclear reactors by successive captures of neutrons by the nuclei of standard fuel, the minor actinides being americium, curium and neptunium.

STATE OF THE PRIOR ART

At present, all of the schemas for reprocessing irradiated fuels exploited commercially are based on the PUREX hydrometallurgical process (acronym corresponding to "Plutonium Uranium Refining by Extraction"). In this process, the irradiated fuel is firstly dissolved in nitric acid. The resulting solution is then brought into contact with an organic solvent (for example, tributylphosphate) acting as an extractant not miscible with nitric acid such that at the end of this process two phases are recovered:

an organic phase comprising uranium and plutonium; and an aqueous phase comprising the minor actinides (such as americium and curium) and fission products, which is also called "PUREX raffinate".

The organic phase comprising the uranium and plutonium undergoes a step of extraction, so as to isolate the uranium from the plutonium, which will be able to be reused to form uranium and/or plutonium based fuels.

The PUREX process developed during the Second World War is now implemented in commercial factories of large capacity, having typically a reprocessing throughput of the order of 1000 t/year. It has benefited particularly from numerous improvements, which have made it a reliable, robust process and which produces little secondary wastes.

The PUREX process has nevertheless the following limitations:

it is often considered as potentially proliferating, because it makes it possible to obtain, after the extraction of the organic phase, a flux of pure plutonium;

the organic solvent used as extractant is sensitive to irradiation, which imposes for fuels with high combustion rates long cooling times before reprocessing;

finally, in order to be subjected to reprocessing, the fuel has to be dissolved beforehand in nitric acid, which poses a problem in the case of refractory fuels not soluble in nitric acid.

Alternatively, pyrochemical processes for reprocessing irradiated nuclear fuels have been proposed, which implement separative techniques at high temperature in a medium comprising at least one molten salt (mainly, molten chloride or molten fluoride media). They were intensively studied in the 1970s, either for the reprocessing of spent fuels from conventional reactors, or for the on-line reprocessing of the fuel of a molten salt reactor. In fact, molten salts (generally in the form of alkali chlorides or fluorides) can quite easily dissolve the fuels, dedicated targets and refractory matrices envisaged for reactors of the future. They implement reagents insensitive to irradiation and transparent to neutrons, which makes it possible to reprocess fuels with a high burn-up rate that have not been cooled down very much, without constraints of criticality. Finally, they do not make it possible to obtain directly a flux of pure plutonium.

Once the actinide elements have been recovered, they may be re-used to be transformed into oxides, so as to form a new fuel, this transformation being able to pass by a step of precipitation in a medium comprising a molten salt, in particular a medium comprising a molten chloride salt.

The precipitation may be induced by a technique involving the addition of oxide ions ($O^{2-}$) to the medium comprising a molten salt by means of reagents such as $Li_2CO_3$ or BaO.

When the reagent is based on carbonate ions, the $O^{2-}$ ions are from the following dissociation reaction:

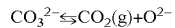

The $O^{2-}$ ions then react with a chloride of actinide or lanthanide, which leads, in the case of plutonium trichloride, to the following reaction:

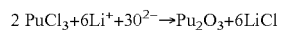

Nevertheless, this technique induces:

on the one hand, a modification of the medium comprising a molten salt (particularly when the reagent used is BaO) and, on the other hand, an increase in the volume of said medium, which has the consequence of increasing the volume of the wastes to be processed and thus difficulties of management of said wastes, especially since they are not vitrifiable;

a production of carbon dioxide (particularly when the reagent used is a carbonate reagent), which may lead to a phenomenon of undesired foaming.

The precipitation may be also induced by the addition to the medium comprising a molten salt of gaseous oxygen, which generates, when the medium comprising a molten salt contains chlorides of lanthanide(s) or actinide(s), a precipitate of oxide or oxychloride of lanthanide(s) or actinide(s), the oxychloride, if applicable, being able to be made to undergo a step of calcination under air in order to convert it into an oxide.

As an example, when the medium comprising a molten salt comprises lanthanum trichloride, the precipitation reaction may be formalised by the following chemical equation:

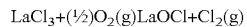

the lanthanum oxychloride being able to be calcinated under air at more than 1000° C., in order to obtain the oxide $La_2O_3$.

When the medium comprising a molten salt comprises cerium trichloride $CeCl_3$, the oxide $CeO_2$ is obtained directly at the end of the precipitation reaction.

Nevertheless, in the case of actinides, and in particular, uranium and neptunium, this leads to the formation on the one hand of oxychlorides of uranium and neptunium, which are soluble and, as a result, do not form a precipitate and, on the other hand, to precipitates including cations of the solvent (such as uranates).

Other precipitation techniques have been taken up, such as precipitation with boric acid ($H_3BO_3$) or with lithium phosphate ($Li_3PO_4$), with respectively the following drawbacks:

the formation of oxides comprising boron and requiring the use of an excess of boric acid, which substantially pollutes the medium comprising a molten salt;

the formation of a phase of the phosphate type and not of the oxide type.

With a view to what already exists, the inventors have set out to develop a novel process for manufacturing an oxyhalogenide, such as an oxychloride, and/or oxide of actinide(s) and/or of lanthanide(s) in a medium comprising a molten salt, which does not have the following drawbacks:

the pollution by cations of the medium comprising a molten salt, thereby inducing, in a subsequent manner, problems of management of the medium comprising a molten salt;

the formation with the actinide or lanthanide elements of products other than oxyhalogenides or oxides.

DESCRIPTION OF THE INVENTION

To do so, the authors of the present invention propose a novel process for manufacturing an oxyhalogenide, for example an oxychloride and/or oxide of actinide(s) and/or of lanthanide(s), from a halogenide of actinide(s) and/or of lanthanide(s), such as a chloride of actinide(s) and/or of lanthanide(s) present in a medium comprising at least one molten salt, said process comprising a step of bringing said halogenide of actinide(s) and/or of lanthanide(s) present in said medium comprising at least one molten salt into contact with a wet inert gas, said halogenide of actinide(s) and/or of lanthanide(s) being, advantageously, a chloride of actinide(s) and/or of lanthanide(s) and said at least one molten salt being a salt of the chloride type.

Before going into greater detail in the description of the invention, the following definitions are defined.

Medium comprising at least one molten salt is taken to mean an anhydrous liquid resulting from the melting of at least one salt, such as an alkaline salt.

Wet inert gas is taken to mean an inert gas (in other words a neutral gas, or, in other words, a gas which does not react with the elements with which it is in contact) loaded with water vapour.

Oxyhalogenide of actinide(s) and/or of lanthanide(s) is taken to mean an inorganic compound resulting from the combination of at least one actinide element and/or at least one lanthanide element with a halogen, such as chlorine, and oxygen.

Oxide of actinide(s) and/or of lanthanide(s) is taken to mean an inorganic compound resulting from the combination of at least one actinide element and/or at least one lanthanide element with oxygen.

Halogenide of actinide(s) and/or of lanthanide(s) is taken to mean an inorganic compound resulting from the combination of at least one actinide element and/or at least one lanthanide element with a halogen element, such as chlorine.

According to the invention, to achieve the manufacture of an oxyhalogenide, such as a oxychloride, and/or oxide of actinide(s) and/or of lanthanide(s), a halogenide, such as a chloride, of actinide(s) and/or of lanthanide(s) present in a medium comprising a molten salt is brought into contact with a wet inert gas, the latter causing the precipitation of the oxyhalogenide, such as a oxychloride, and/or oxide of actinide(s) and/or of lanthanide(s).

The medium comprising at least one molten salt may comprise at least one salt of the halogenide type, such as an alkali metal halogenide, an alkaline earth metal halogenide and mixtures thereof.

More particularly, the salt of halogenide type may be a chloride salt, such as an alkali metal chloride, an alkaline earth metal chloride and mixtures thereof.

As examples of alkali metal chlorides, sodium chloride, lithium chloride, potassium chloride and mixtures thereof may be cited.

As an example of alkaline earth metal chloride, calcium chloride may be cited.

It may be particularly a mixture comprising an alkali metal chloride and an alkaline earth metal chloride, such as a mixture of lithium chloride and calcium chloride.

The inert gas may be a noble gas, in other words a gas constituted of an element selected from helium, neon, argon, krypton, xenon and radon, the preference being for argon. Noble gases are particularly advantageous, in that they do not dissolve in the medium comprising at least one molten salt, and do not add, as a result, any new elements into said medium, which does not lead to an increase in volume of said medium. It is understood that, according to the invention, said noble gas will be loaded with water vapour.

The inert gas may be also a gas such as nitrogen $N_2$.

Those skilled in the art will choose, in an appropriate manner, the content of water vapour contained in the inert gas as well as the flow rate with which it is brought into contact with the medium comprising a molten salt, so as to lead to the formation of the oxyhalogenide, such as a oxychloride, and/or of the oxide of actinide(s) and/or of lanthanide(s).

The halogenide of actinide(s) and/or of lanthanide(s) is; advantageously, a chloride of actinide(s) and/or of lanthanide(s), said chlorides of actinide(s) and/or of lanthanide(s) being able to be derived from spent fuel reprocessing flux. More specifically, the halogenide of actinide(s) and/or of lanthanides is a chloride of actinide(s) (III) and/or of lanthanide(s) (III) (III indicating the degree of oxidation of said actinides and of said lanthanides).

Advantageously, the halogenide of actinide(s) and/or of lanthanide(s) is a chloride of actinide(s) and/or of lanthanide(s) and the molten salt(s) are chloride salts. Thus, bringing said chloride of actinide(s) and/or of lanthanide(s) into contact with the chloride salt(s) does not generate any modification in the nature of the molten salt(s) by ionic exchange, as is the case, when the halogenide of actinide(s) and/or of lanthanide(s) is a fluoride of actinide(s) and/or of lanthanide(s) and the molten salt(s) are chloride salts. This can thereby largely facilitate the recycling of the molten salt(s) after the use thereof within the scope of the process of the invention, which can thereby be integrated in the complete reprocessing cycle of a nuclear fuel.

The actinide elements incorporated in the halogenide of actinide(s), such as a chloride of actinide(s), and at the end of the process of the invention in the oxyhalogenide, such as a oxychloride, and/or oxide of actinide(s) may be any actinide element of the periodic table of elements and, in particular, the actinide elements uranium, plutonium and/or thorium and the minor actinides, such as americium, curium and neptunium, and mixtures thereof.

The lanthanide elements incorporated in the halogenide of lanthanide(s), such as a chloride of lanthanide(s), and at the end of the process of the invention in the oxyhalogenide, such as a oxychloride, or oxide of lanthanide(s), may be any lanthanide element of the periodic table of elements and in particular, cerium and neodymium.

The step of bringing into contact may be carried out conventionally by bubbling wet inert gas in the medium comprising at least one molten salt, in which is included the halogenide of actinide(s) and/or of lanthanide(s), said halogenide of actinide(s) and/or of lanthanide(s) being able to be, advantageously, a chloride of actinide(s) and/or of lanthanide(s).

From a concrete point of view, the formation of the oxyhalogenide and/or of the oxide of actinide(s) and/or of lanthanide(s) results in a phenomenon of precipitation resulting from the aforementioned step of bringing into contact. Advantageously, there is quantitative formation of oxide of actinide(s) and/or of lanthanide(s), this formation being accompanied, conventionally, by an increase in the degree of oxidation of the actinide element and/or of the lanthanide element (for example, passage from a degree of oxidation (III) to a degree of oxidation (IV)).

Without being linked by theory, the precipitation reaction may be explained by the reaction of the water vapour contained in the wet inert gas with the anions contained in the medium comprising at least one molten salt to form $O^{2-}$ oxide ions, which are going to react with the halogenide of actinide(s) and/or of lanthanides, such as a chloride of actinide(s) and/or of lanthanide(s) to form, by precipitation, an oxyhalogenide, such as a oxychloride, and/or an oxide of actinide(s) and/or of lanthanide(s).

As an example, when the halogenide of actinide(s) and/or of lanthanide(s) is a trichloride of formula $AnCl_3$ (An representing an actinide element), the formation of oxychloride (of formula AnOCl) and/or of oxide of actinide (of formulas $An_2O_3$ or $AnO_2$) may be symbolised by the following overall reactions:

$$2AnCl_3 + 3H_2O_{(g)} \rightarrow An_2O_3 + 6HCl_{(g)}$$

$$AnCl_3 + 2H_2O_{(g)} \rightarrow AnO_2 + 3HCl_{(g)} + (\tfrac{1}{2})H_{2(g)}$$

$$AnCl_3 + H_2O_{(g)} \rightarrow AnOCl + 2HCl_{(g)}$$

Before the aforementioned step of bringing into contact, the process of the invention may comprise a step of preparing the medium comprising at least one molten salt, in which is present the halogenide of actinide(s) and/or of lanthanide(s), said halogenide of actinide(s) and/or of lanthanide(s) being, advantageously, a chloride of actinide(s) and/or of lanthanide(s).

This step of preparation may be implemented according to different variants.

According to a first variant, the aforementioned step of preparation may comprise the following operations:

an operation of mixing, in the solid state, the constituent salt(s) of the medium and the halogenide of actinide(s) and/or of lanthanide(s);

an operation of heating said mixture obtained to an appropriate temperature to obtain the melting of said mixture.

According to a second variant, the aforementioned step of preparation may comprise the following operations:

an operation of mixing, in the solid state, the constituent salt(s) of the medium other than the halogenide of actinide(s) and/or of lanthanide(s);

an operation of heating said mixture obtained to an appropriate temperature to obtain the melting of said mixture (referred to hereafter as "molten mixture");

an operation of incorporating into the molten mixture the halogenide of actinide(s) and/or of lanthanide(s).

Whether for the first variant or the second variant, an operation of dehydration of the salts may be carried out before the heating operation.

Conventionally, whatever the embodiment variant, the step of preparing the medium may be implemented in a crucible made of a material inert in the operating conditions of this step, said material being able to be a ceramic material (such as alumina) or a carbonated material, such as vitreous carbon.

Before the aforementioned step of bringing into contact, the process of the invention may comprise, also, a step of preparing the wet inert gas, for example, by bubbling of an inert gas in a bubbler comprising water and an outlet enabling the diffusion of the inert gas loaded with water vapour.

Once the precipitation has been carried out following the step of bringing into contact, the process of the invention may comprise a step of isolating the oxyhalogenide, such as an oxychloride, and/or oxide formed, said isolating step being able to consist in simply filtering the medium resulting from the step of bringing into contact to recover the precipitate.

At the end of this isolating step, the medium comprising at least one molten salt may be brought to a step of recycling, for example, by distillation.

As indicated by the global reactions illustrated above, the step of bringing into contact may be characterised, apart from the formation of oxyhalogenide(s) and/or oxide(s) of actinide(s) or of lanthanide(s), by the concomitant formation of hydrochloric acid, said hydrochloric acid being able to be neutralised during a step of neutralisation subsequent to the step of bringing into contact, said step of neutralisation being able to consist in adding a base downstream, of the reactor, where the step of bringing into contact takes place (for example, by placing a bubbler filled with caustic soda downstream of the reactor).

In this process, when it is wished to obtain exclusively oxides of actinide(s) and/or of lanthanide(s) and when the product obtained at the end of the step of bringing into contact contains oxyhalogenides of actinide(s) and/or of lanthanide(s), such as oxychlorides of actinide(s) and/or of lanthanide(s), the process of the invention may then comprise a step of calcination under air of the precipitate obtained, so as to transform the oxyhalogenides of actinide(s) and/or of lanthanide(s), such as oxychlorides, into oxide(s) of actinide(s) and/or of lanthanide(s).

The product obtained according to the invention comprising oxides and/or oxyhalogenides of actinide(s) and/or of lanthanide(s), such as oxychlorides, may be present, when there is simultaneous presence of actinide(s) and/or of lanthanide(s), in the form of a solid solution, in other words a mixing by dissolution of actinide(s) and/or of lanthanide(s) in a crystal lattice of the oxide or oxyhalogenide type.

It is understood that, to be able to speak of solid solution, it is necessary that there is necessarily more of an actinide and/or lanthanide element separate from each other.

Thus, one speaks of solid solution in the following cases where:

several separate actinide elements are present in the oxide or oxyhalogenide crystal lattice;

several separate lanthanide elements are present in the oxide or oxyhalogenide crystal lattice;

one actinide element and one lanthanide element are present in the oxide or oxyhalogenide crystal lattice;

one actinide element and several lanthanide elements are present in the oxide or oxyhalogenide crystal lattice; or several actinide elements and one lanthanide element are present in the oxide or oxyhalogenide crystal lattice.

The present invention may be implemented in a reactor comprising a crucible, potentially removable, the crucible serving as receptacle to the medium comprising at least one molten salt, said reactor being able to be placed in a furnace making it possible to supply the heat needed to bring about melting of the salts, when the process of the invention comprises a step of preparing the medium comprising at least one molten salt.

The process of the invention is particularly suited to the preparation of nuclear fuels belonging to the category of mixed oxides, such as oxides of MOX type $(U,Pu)O_2$ and $(U,Pu,Am)O_2$ from recycled chlorides of actinides.

Other characteristics will become clearer on reading the complement of description that follows, which relates to examples of manufacturing a fuel according to the invention.

Obviously, the following examples are only given by way of illustration of the subject matter of the invention and do not constitute, in any way, a limitation of said subject matter.

DETAILED DESCRIPTION OF PARTICULAR EMBODIMENTS

Example 1

This example illustrates the co-precipitation of cerium (III) and neodymium (III) in the form of a solid solution, the cerium (III) and neodymium (III) constituting elements simulating actinide elements (III).

This example is implemented in an inert quartz reactor under dry argon atmosphere comprising a removable crucible made of alumina or vitreous carbon, said reactor being itself in a vertical tube furnace, which is going to supply the energy needed to melt the salts intended to enter into the constitution of the medium comprising a molten salt. Wet argon, the reagent required for the precipitation of said solid solution, is produced by bubbling argon through a Teflon bubbler (1 L) provided with a Teflon diffuser (for the diffusion of argon) and comprising a water height of 70 mm. The partial pressure of water in argon may be controlled by the temperature of the water, thereby fixing the saturating vapour pressure thereof.

In the aforementioned crucible, a mixture of LiCl (2.32 g; 0.055 mol), $CaCl_2$ (14.18 g; 0.128 mol), $CeCl_3$ (1.73 g; 7.0 mmol) and $NdCl_2$ (1.76 g; 7.0 mmol) is added. The crucible is then placed in the quartz reactor which is placed in the vertical tube furnace. The mixture is dehydrated by application of a vacuum in the reactor and increasing the temperature at a rate of 2° C./min up to 150° C., the vacuum and the temperature of 150° C. being maintained for 6 hours. At the end of this treatment, the reactor is placed overnight under a flow of dry argon. The temperature of the reactor is then taken to 705° C., so as to bring about the melting of the mixture, thereby forming a medium comprising a molten salt. In said medium, the bubbling of wet argon is carried out at a rate of 2 L/h for 8 hours via an alumina tube immersed in the medium (wet argon being argon saturated with water vapour at ambient temperature), such that a precipitate is formed. At the end of the precipitation reaction, the crucible is brought back to ambient temperature with a flow of dry argon, then the precipitate is recovered by dissolution of the medium comprising a salt previously dissolved in water followed by a filtration. ICP-AES analysis of the washing waters made it possible to estimate a level of precipitation of neodymium and cerium of the order of 99.9% for these two elements, which corresponds to a quasi-quantitative precipitation yield.

The isolated precipitate was then analysed by different techniques:
X-ray diffraction (hereafter symbolised by the abbreviation "XRD");
scanning electron microscopy (hereafter symbolised by the abbreviation "SEM");
Castaing microprobe analysis; and
thermogravimetric analysis.

The diagram obtained by XRD indicates that the precipitate obtained is a product mainly composed of mixed oxychloride (Ce,Nd)OCl. The intermediate lattice parameter of this oxychloride with those of the oxychloride of neodymium alone and of the oxychloride of cerium alone indicate the formation of a solid solution of these two elements. The precipitate also contains a small proportion of mixed oxide of cerium and neodymium rich in cerium of formula $Ce_{0.8}Nd_{0.2}O_{1.9}$, which attests to the oxidation of a part of the cerium (III) into cerium (IV). The selective dissolution of the oxychloride in hydrochloric acid (0.1 mol/L) makes it possible to estimate the presence of $Ce_{0.8}Nd_{0.2}O_{1.9}$ at a rate of 10% by weight.

Scanning electron microscopy attests to the presence of oxychloride (Ce,Nd)OCl, which is present in the form of platelets and $Ce_{0.8}Nd_{0.2}O_{1.9}$, which is present in the form of cubes.

Analysis by Castaing microprobe makes it possible, after introduction of the precipitate in a resin followed by polishing thereof, to carry out the mapping of a section of grains. This mapping confirms the formation of mixed oxychloride (Ce,Nd)OCl with the presence, in a same grain, of cerium, neodymium and chlorine. The presence of oxide $Ce_{0.8}Nd_{0.2}O_{1.9}$ is also confirmed by the high concentration of cerium, the low concentration of neodymium and the absence of chlorine.

Thermogravimetric analysis made it possible to observe a loss of mass of the order of 12% during the application of a thermal cycle of 5° C./min until a temperature of 1300° C. is reached, attesting to the transformation of the mixed oxychloride (Ce,Nd)OCl into mixed oxide $Ce_{0.5}Nd_{0.5}O_{1.75}$, said transformation being able to be illustrated by the following chemical equation:

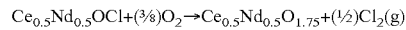

$$Ce_{0.5}Nd_{0.5}OCl + (3/8)O_2 \rightarrow Ce_{0.5}Nd_{0.5}O_{1.75} + (1/2)Cl_2(g)$$

The formation of $Ce_{0.5}Nd_{0.5}O_{1.75}$ is also confirmed by XRD.

Example 2

This example illustrates the precipitation of uranium (III) in the form of uranium oxide $UO_2$.

It is implemented in the same reactor as that mentioned in example 1.

In the aforementioned crucible, a mixture of LiCl (2.61 g; 0.062 mol) and $CaCl_2$ (15.94 g; 0.144 mol) is added. The crucible is then placed in the quartz reactor which is placed in the vertical tube furnace. The mixture is dehydrated by application of a vacuum in the reactor and increasing the temperature at a rate of 5° C./min up to 300° C., the vacuum and the temperature of 300° C. being maintained for 1 hour. At the end of this treatment, the reactor is placed overnight under a flow of dry argon. The temperature of the reactor is then taken to 705° C., so as to bring about the melting of the mixture, thereby forming a medium comprising a molten salt. Uranium chloride $UCl_3$ (1.45 g; 4.2 mmol) is introduced into the medium comprising a molten salt via an airlock followed by a bubbling of dry argon for one hour to achieve a homogenisation of the medium. The bubbling of wet argon is then carried out at a rate of 4 L/h for 5 hours via a tube made of vitreous carbon immersed in the medium (wet argon being argon saturated with water vapour at ambient temperature), such that a precipitate is formed. At the end of the precipitation reaction, the crucible is brought back to ambient temperature with a flow of dry argon, then the precipitate is recovered by dissolution of the medium comprising a salt previously dissolved in water followed by filtration. ICP-AES analysis of the washing waters made it possible to estimate a level of precipitation of uranium present in the salt of the order of 99.9%. 75% of the uranium introduced is recovered in the precipitate due to volatilisation of part of said uranium, which condenses on the walls of said reactor.

The isolated precipitate was then analysed by different techniques:

X-ray diffraction (hereafter symbolised by the abbreviation "XRD"); and thermogravimetric analysis.

The diagram obtained by XRD indicates that the precipitate obtained is composed exclusively of uranium oxide $UO_2$.

Thermogravimetric analysis made it possible to observe a weight gain of the order of 4% during the application of a thermal cycle of 5° C./min until a temperature of 800° C. is obtained, attesting to the transformation of uranium oxide $UO_2$ into $U_3O_8$, the presence of $U_3O_8$ being confirmed by XRD analysis.

Example 3

This example illustrates the precipitation of plutonium (III) in the form of plutonium oxide $PuO_2$.

It is implemented in the same reactor as that mentioned in example 1.

In a vitreous carbon crucible, a mixture of LiCl (6.06 g; 0.143 mol) and $CaCl_2$ (36.94 g; 0.333 mol) is added, dehydrated beforehand at 250° C. under vacuum. The crucible is then placed in the quartz reactor which is placed in the vertical tube furnace. The mixture is melted at 710° C. and dehydrated by bubbling HCl (g) at a flow rate of 2 L/h in the melted mixture, before being cooled under dry argon.

The saline mixture thereby obtained in then transferred via a glove box into a vitreous carbon crucible. Plutonium oxide $PuO_2$ (0.4569 g; $1.69*10^{-3}$ mol) is added at a rate of 1% by weight and the crucible is introduced into a quartz reactor similar to that used previously. The mixture is melted at 710° C. under atmosphere of dry argon. The dissolution of the plutonium oxide is carried out by carbochlorination. A bubbling of chlorine at a rate of 2 L/h is carried out in the mixture for 45 minutes via a tube made of graphite carbon and in the presence of graphite in contact with the mixture. The reactor is then isolated under chlorine atmosphere for 24 hours at 710° C. The chlorine is finally evacuated by circulation of dry argon. A sample taken from the bath shows a blue colour characteristic of plutonium (III) in the medium comprising a molten salt.

The dissolution of the plutonium oxide $PuO_2$ by carbochlorination makes it possible to obtain a solution of Pu(III) at 0.88% by weight in $LiCl—CaCl_2$.

Then, the bubbling of wet argon is carried out at a rate of 2 L/h for 5 hours via a tube made of vitreous carbon immersed in the medium (wet argon being argon saturated with water vapour at ambient temperature), such that a precipitate is formed. The precipitate is recovered by dissolution of the medium comprising a salt previously dissolved in nitric acid 0.5 M and filtration. The precipitate thereby recovered is then dried.

The isolated precipitate was then analysed by X-ray diffraction. The diagram obtained indicates that the precipitate obtained is composed exclusively of plutonium oxide $PuO_2$.

During the precipitation, two samples were taken (respectively after 1 h and 5 h of bubbling), dissolved in nitric acid filtered to eliminate the precipitate and analysed by spectrometry and a counting, so as to determine the concentration of plutonium (III) in the salt.

| Precipitation time | Concentration of Pu(III) (mol/kg) | % of plutonium precipitate |
|---|---|---|
| 0 | $3.7 * 10^{-2}$ | — |
| 1 | $7.1 * 10^{-4}$ | 98.1 |
| 5 | $2.4 * 10^{-4}$ | 99.4 |

After 5 hours of bubbling, the plutonium is incorporated at more 99% in the precipitate.

The invention claimed is:

1. A process of manufacturing an oxychloride and/or oxide of actinide(s) and/or of lanthanide(s), the process comprising:
   contacting at least one selected from the group consisting of an actinide chloride and a lanthanide chloride present in a medium comprising a molten chloride salt with a wet inert gas,
   wherein the contacting does not modify the molten chloride salt by ionic exchange.

2. The process according to claim 1, wherein the molten chloride salt is selected from the group consisting of an alkali metal chloride, an alkaline earth metal chloride, and any mixture thereof.

3. The process according to claim 1, wherein the medium comprises a mixture of molten lithium chloride and calcium chloride.

4. The process according to claim 1, wherein the inert gas is a noble gas.

5. The process according to claim 1, wherein the inert gas is argon.

6. The process according to claim 1, wherein the inert gas is nitrogen.

7. The process according to claim 1, wherein the actinide is at least one selected from the group consisting of uranium, plutonium, thorium, and a minor actinide.

8. The process according to claim 1, wherein said contacting is carried out by bubbling the wet inert gas in the medium.

9. The process according to claim 1, further comprising, before said contacting, preparing the medium, in which the chloride of the at least one of an actinide and a lanthanide is present.

10. The process according to claim 1, further comprising, before said contacting, preparing the wet inert gas.

11. The process according to claim 1, further comprising, isolating the oxychloride and/or oxide formed by said process.

12. The process according to claim 1, comprising contacting at least one actinide chloride present in the medium comprising a molten chloride salt with the wet inert gas.

13. The process according to claim 12, wherein the actinide is at least one selected from the group consisting of uranium, plutonium, thorium, and a minor actinide.

14. The process according to claim 1, comprising contacting at least one lanthanide chloride present in the medium comprising a molten chloride salt with the wet inert gas.

15. The process according to claim 14, where in the lanthanide is cerium or neodymium.

16. The process according to claim 1, further comprising recycling the molten chloride salt.

17. The process according to claim 1, wherein the yield of the oxychloride and/or oxide of actinide(s) and/or of lanthanide(s) is more than 99%.

18. The process according to claim 1, which is a process for manufacturing an oxychloride of an actinide or a lanthanide.

19. The process according to claim 1, which is a process for manufacturing an oxide of an actinide or a lanthanide.

* * * * *